2,987,095
TIRE CORD STRUCTURE
Harry A. Toulmin, Jr., Dayton, Ohio, assignor to The Commonwealth Engineering Company of Ohio, Dayton, Ohio
Filed Oct. 10, 1958, Ser. No. 766,474
5 Claims. (Cl. 152—357)

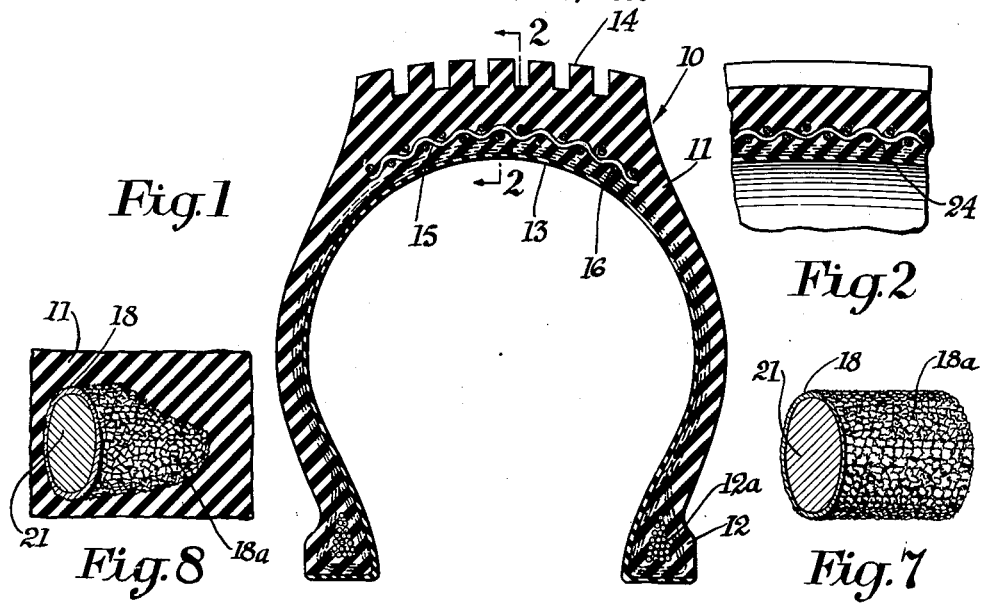
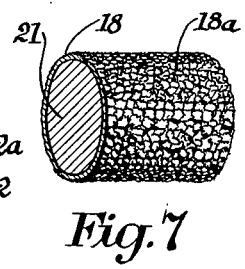
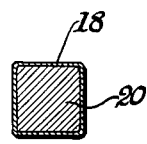
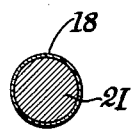
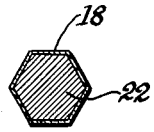
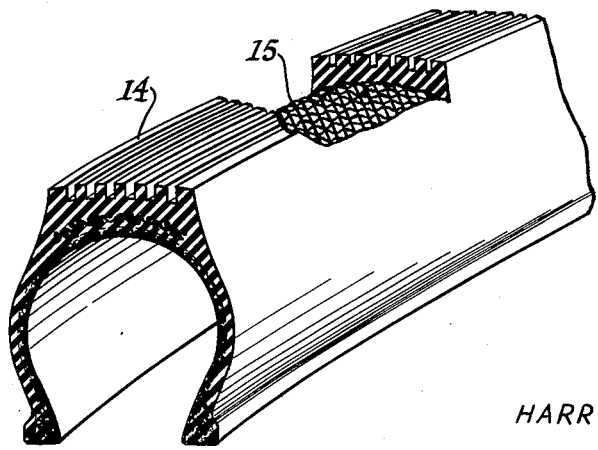
INVENTOR
HARRY A. TOULMIN, JR.
BY Toulmin & Toulmin
ATTORNEYS United States Patent Office 2,987,095
Patented June 6, 1961

This invention relates to pneumatic tires, and more especially to tire construction.

In the construction of pneumatic tires having reinforcing material embedded in the carcass of the tire, it has been a difficult problem heretofore to effectively unite the reinforcing material with the rubber. Various methods have been employed in an attempt to overcome this difficulty with varying success. The present invention overcomes this difficult problem for all practical purposes and provides a commercially useful method of constructing a reinforced pneumatic tire casing.

It is the principal object of this invention to provide a pneumatic tire, particularly a casing having improved construction and wherein reinforcing metal is incorporated and thoroughly united with the rubber in the body of the casing to reinforce the same.

Another object of the invention is to utilize metal inserts for embedding in the body of a tire, especially adjacent the tire tread for reinforcing the same and providing a long-wearing tire and wherein the reinforcing material will not tend to separate from the rubber during use.

These and other objects and advantages of the invention will become apparent from the following description taken in conjunction with the drawings, and wherein—

FIGURE 1 is a cross-sectional view through a pneumatic tire constructed in accordance with the present invention;

FIGURE 2 is a fragmentary sectional view taken substantially on the line 2—2 of FIGURE 1;

FIGURE 3 is a sectional view taken through a strand of metal which is coated by gas plating with a metal receptive for interlocking with the rubber of the tire, said strand being of rectangular cross-sectional shape;

FIGURE 4 is a similar view of a strand in section and having a circular cross-section;

FIGURE 5 is a like view in section of a strand of polygon shape and having the metal coating thereon;

FIGURE 6 is a view in perspective, partly in section, and illustrating a tire casing having a reinforcing metal cloth insert in the body of the tire beneath the tread;

FIGURE 7 is a fragmentary view on an enlarged scale illustrating the rough, pore-like gas plated metal coating; and FIGURE 8 is a like view as FIGURE 7 and illustrating the interlocking of the rubber with the gas plated metal wire.

Referring to the drawing, there is illustrated an improved pneumatic tire structure in which the metal reinforcing inserts consist of gas plated metal shapes firmly interlocked with the rubber and vulcanized. A tire casing 10 is shown which comprises a body of rubber 11 having a bead section 12 with gas plated metal wire inserts 12a. An inner rubber liner or facing layer 13 forms a seal against escape of air.

The tire casing comprises a tread portion 14 which is provided with a reinforcing gas plated metallized insert 15. This insert consists of multiple strands of high tensile strength material wherein each strand is metallized by gas plating to provide a porous, tooth-like surface which the soft, plastic rubber flows into or engages into and upon vulcanization the rubber is firmly united to each strand through the porous, tooth-like gas plated metal surface portion of the strand. While the strands are illustrated on the drawing as composed of metal or metal alloy material, these strands may however be composed of organic or inorganic materials and which have sufficient tensile strength. For example, "nylon" (polyamide), "Orlon" (acrylonitrile) and the like synthetic fiber, as well as natural fibers, such as silk, may be metallized by gas plating to provided the strand with a rubber-receptive porous metal surface so that the rubber can be firmly bonded to the strands.

To produce a rubber-receptive rough, porous metal surface on the strands of reinforcing material for embedding into the rubber, the gas plating of the strands or woven material is plated by deposition of metal thereon as a single layer of approximately 0.00001 to 0.00025 of an inch in thickness. Preferably the gas plating is held to a deposit of metal of between 0.00005 inch and 0.00015 inch. This initial layer is very thin and porous after which the gas plated strand or strands are heated to drive off any adsorbed gas and which escapes through the thin metal layer and further accentuates its porosity and provides a tooth-like, uniformly rough metal surface.

Heating of the gas plated strands to a temperature of 500 to 1000° F. for two to fifteen minutes is satisfactory. Where the substrate is composed of material which will not withstand this heat treatment the heating may be omitted or limited to below the softening point of the fiber or strand forming the substrate. This treatment provides a porous bonding metal layer for interlocking the rubber to the strands, thus forming a unitary rubber-metal-substrate reinforcing insert.

To reinforce the tread portion of a tire casing, metal is embedded in the body of the rubber at the places desired to be reinforced. The metal insert may comprise a wire or cloth 15, the same being composed of strands which have been gas plated, and such as generally indicated at 16. These strands may be individually or group gas plated with metal. Metal carbonyls of nickel or chromium or the like metal may be used to gas plate the strand and provide a surface for uniting the rubber to the metal strands. The coating of metal on the stands is shown generally at 18 in FIGURES 3, 4 and 5, and comprises a thin, adherent porous metal coating as illustrated at 18a in FIGURES 7 and 8. The individual strands, which may be woven to provide a fabric or interwoven metal layer and may comprise different cross-sectional shapes, for example they may be rectangular cross-sectional shape as shown at 20; circular as shown at 21; or polygon as shown at 22, in FIGURES 3, 4 and 5 respectively.

In the bead portion 12a of course, the strands will be circular and arranged parallel as shown in FIGURE 1. It is essential that the strands of metal making up the reinforcing insert 15 be gas plated to provide a relatively porous or rough metal film into which the rubber interlocks as illustrated at 24 in FIGURE 2. In this manner, by utilizing gas plated metal strands, such as shown in FIGURES 3, 4 and 5, and wherein each of the strands comprises an outer shell or coating of gas plated metal and which provides a relatively porous surface into which the rubber is embedded and interlocked to firmly unite and retain the reinforcing metal strands into the body of the tire carcass.

The strands making up the reinforcing material preferably are metal, but if desired the same may be formed of inorganic ceramic material such as glass or synthetic fibers, such as nylon, inasmuch as these strands can be gas plated with metal as is well known in the art. The essential feature is that of providing the strand with a gas plated outer shell of metal and which has been found to improve the interlocking and uniting of the rubber to the reinforcing material so that the same becomes substantially integral and does not separate even under the most strenuous conditions of tire service.

As illustrated in the drawing, the embodiment shown illustrates the use of metal strands gas plated with metals and which strands are formed if desired into a woven cloth-like fabric as illustrated in FIGURE 6, and inserted in the body of the tire casing beneath the tire tread to form the improved tire structure. The gas plated metals which are found useful are set forth in the following table in the form of their compounds from which they are derived, e.g., the compound is used in the gaseous form and heat-decomposed to deposit the metal. These metal plate materials are as follows—

| Plating Material | System pressure, mm. of Hg | Temperature range of base materials in degrees F. |
| --- | --- | --- |
| Ni(CO)$_4$ | 0.5–1.0 | 350–450 |
| Cr(CO)$_6$ | 0.5–1.8 | 375–450 |
| Mo(CO)$_6$ | 0.5–1.8 | 450–650 |
| W(CO)$_6$ | 0.5–1.8 | 525–775 |
| Cu(C$_5$H$_7$O$_2$)$_2$ | 0.5–1.8 | 400–750 |

If desired, other metals may be used to form the metal coating on the strands. Metal for gas plating may be introduced as gaseous metal carbonyls or vaporized solutions of certain of the metal carbonyls in readily vaporizable solvents (for example, petroleum ether) also nitroxyl compounds, nitrosyl carbonyls, metal hydrides, metal alkyls, metal halides, and the like.

Illustrative compounds of the carbonyl type are nickel, iron, chromium, molybdenum, cobalt, and mixed carbonyls.

Illustrative compounds of other groups are the nitroxyls, such as copper nitroxyl; nitrosyl carbonyls for example cobalt nitrosyl carbonyl; hydrides, such as antimony hydride, tin hydride; metal alkyls or aryls, e.g., aluminum ethyl; metal halogen such as chromyl. chloride; and carbonyl halogens, for example osmium carbonyl bromide, ruthenium carbonyl chloride, and the like.

Each material from which a metal may be gas plated has a temperature at which decomposition is complete. However, decomposition may take place slowly at a lower temperature or while the vapors are being raised in temperature through some particular range. For example, nickel carbonyl completely decomposes at a temperature in the range of 375° F. to 400° F. However, nickel carbonyl starts to decompose slowly at about 175° F., and therefore, decomposition continues during the time of heating from 200° F. to 380° F. A large number of the metal carbonyls and hydrides may be effectively and efficiently decomposed at a temperature in the range of 350° F. to 450° F. When working with most metal carbonyls we prefer to operate in a temperature range of 375° F. to 425° F.

Maintenance of the metal objects at temperatures in the general operating range is easily accomplished with numerous heating means, such as radiant heating, electrical resistance heating, induction heating, and the like.

The material to be decomposed is readily brought to the decomposition temperature by mixing with hot inert gas. Even a fine spray of liquid can be transformed from a liquid at a temperature of 100° F. to a vapor having a temperature of 325° F., in a fraction of a second, and the vapors being decomposed by contact with a heated surface having an even higher temperature.

Preparatory to coating base material the metal strip or object to be plated may be cleaned by employing the conventional methods used in the art, comprising electrochemically cleaning by moving the same through a bath of alkali or acid electrolyte, wherein the strip is made the cathode or anode. Pickling of the metal with hydrochloric, sulfuric or nitric acid, or a combination of acids may also be made as a part of the cleaning process, and the strip thoroughly rinsed or washed prior to introduction into the plating apparatus of this invention.

As a specific example and as illustrated in the drawing, the metal strands may comprise steel wire having a coating of nickel deposited, using the gaseous nickel carbonyl. The metal may be deposited to varying thicknesses but preferably the gas plated metal coating is approximately a thickness of 0.001 inch to 0.10 inch. The preferred thickness to provide the porous metal gas plated film is 0.001 to 0.005 inch. The thickness of the coating is such that the strands composed of metal, organics or glass fibers being such as to preserve the ordinary flexibility of the strands. This is an important feature inasmuch as heretofore when employing stiff, unflexible reinforcing inserts the same tended to separate from the body of the rubber and cause the tire to deteriorate before the tread had worn away.

The tire structure provides an improved tire casing and wherein reinforcing material is inserted and embedded beneath the tire tread so as to provide an improved and long wearing tire, and overcomes the difficulty heretofore of inserts to separate from the body of the rubber. In the present invention the inserts being formed of gas plated strands and which gas plating provides an interlocking pore-like surface for the rubber to permeate into and being vulcanized thereto, provides an improved interlocked metal surface between the reinforcing strands and the rubber of the tire. This is the essential feature of the invention.

Modifications may be resorted to and substitutions made with respect to the materials used without departing from the spirit and scope of this invention and the same is intended to be included herein except as further restricted in the appended claims.

What is claimed is:

1. A tire of the character described, comprising tread and bead portions, said tire being formed of vulcanized rubber and wherein the tread portion comprises metallized nylon strands interwoven to form a reinforcing element, each of said strands having an outer integral porous toothed uniformly rough continuous coating of metal deposited thereon, and said metallized nylon strands being united to the vulcanized rubber of the tire.

2. A tire of the character described in claim 1, and wherein the metal deposited on said nylon strands is nickel.

3. A tire of the character described, comprising tread and bead portions, said tire being formed of vulcanized rubber and wherein the tread portion comprises a metallized fabric insert consisting of strands of organic plastic filaments, which strands each comprises an outer integral porous continuous coating of metal, gas plated thereon, and having a toothed uniformly rough surface whereby a permanent integral uniting of the rubber with the insert is effected.

4. A tire of the character described in claim 3, and wherein said toothed porous metal surface coating on the strands is of a thickness between 0.001 to 0.10 inch and which is integrally united to said rubber.

5. A tire of the character described in claim 4, and wherein the strands are composed of synthetic organic material and the outer porous toothed metal surface is firmly interlocked with said rubber.

References Cited in the file of this patent

UNITED STATES PATENTS

| | | |
| --- | --- | --- |
| 521,006 | Schindel | June 5, 1874 |
| 1,412,326 | Williams | Apr. 11, 1922 |
| 1,438,663 | Roderick | Dec. 12, 1922 |
| 2,605,201 | Howe | July 29, 1952 |
| 2,640,523 | Palmer | June 2, 1953 |
| 2,653,879 | Fink | June 29, 1953 |
| 2,791,515 | Nack | May 7, 1957 |

OTHER REFERENCES

Publication "Steel," pages 120, 121, 124, vol. 133, No. 16.